(No Model.)

A. L. EMERY.
FILTER.

No. 549,062. Patented Oct. 29, 1895.

Witnesses
F. R. Cornwall
Hugh H. Wagner

Inventor:
Avery L. Emery
By
Paul Bakewell
his atty.

United States Patent Office.

AVERY L. EMERY, OF ST. LOUIS, MISSOURI, ASSIGNOR TO ARTHUR F. GARESCHÉ AND ANDREW D. BARLOW, OF SAME PLACE.

FILTER.

SPECIFICATION forming part of Letters Patent No. 549,062, dated October 29, 1895.

Application filed March 27, 1895. Serial No. 543,370. (No model.)

*To all whom it may concern:*

Be it known that I, AVERY L. EMERY, a citizen of the United States, residing at the city of St. Louis, State of Missouri, have invented a certain new and useful Improvement in Filters, of which the following is a full, clear, and exact description, reference being had to the accompanying drawings, forming part of this specification, wherein—

Figure 1:
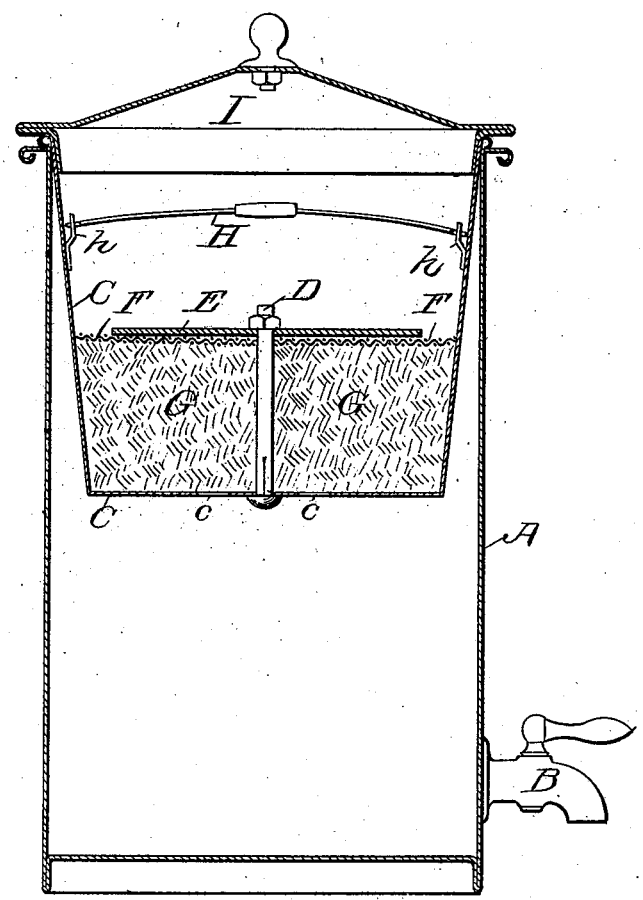
Figure 2:
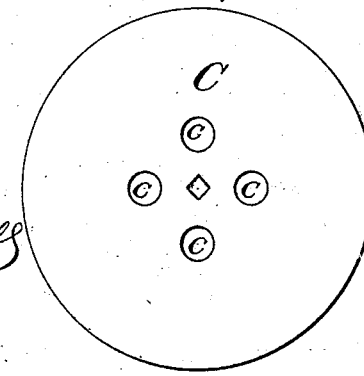

Figure 1 is a vertical sectional view. Fig. 2 is a bottom plan view of the removable vessel which contains the water to be filtered.

This invention relates to a new and useful improvement in filters of that class known as "gravity" filters; and it consists in the construction, arrangement, and combination of the several parts, all as will hereinafter be described, and afterward pointed out in the claim.

In the drawings, A indicates a vessel, in the bottom portion of which is arranged a cock B for drawing off the filtered water. Fitting in the upper portion of vessel A is a vessel C, forming a chamber for the reception of water to be filtered, said vessel C having a bottom perforated or formed with openings, as at $c$. Extending up through the bottom of this suspended vessel C is a bolt D, upon which is strung a clamping-plate E, confining a sheet of wire-gauze F beneath it, which retains the filtering material G therebetween and the bottom of vessel C. The filtering material preferably consists of mineral wool, and the water to be filtered passes around the edges of plate E, down diagonally through the filtering material, and out through the openings $c$. By screwing the nut down on bolt D the plate E compresses the filtering material and makes it more solid. The filtering material, in the form of mineral wool, adheres to the metal with which it contacts, and the water is compelled to pass through the body of the filtering material, it finding no path along the sides of the surrounding metal.

To remove the vessel C easily, I arrange ears $h$ on the inside and mount therein a bail H, which, when folded down, is out of the way of the flanges of a cover I which is introduced in the top of vessel C.

I am aware that many minor changes in the construction and arrangement of the several parts of my device can be made and substituted for those herein shown and described without in the least departing from the nature and principle of my invention.

Having thus described my invention, what I claim, and desire to secure by Letters Patent, is—

In a filter, the combination with a suitable vessel A forming a receptacle for the filtered water, of a vessel C suspended from the top of vessel A, said vessel C having a perforated bottom, a bolt secured in said perforated bottom, filtering material arranged in the bottom and around the bolt, a wire gauze arranged on top of the filtering material, and an imperforate plate E strung on the bolt for confining the filtering material in place, whereby, the fluid to be filtered passes outside the edges of plate E and diagonally through the material to the perforations in the bottom of vessel C; substantially as described.

In testimony whereof I hereunto affix my signature, in presence of two witnesses, this 21st day of March, 1895.

AVERY L. EMERY.

Witnesses:
F. R. CORNWALL,
HUGH K. WAGNER.